United States Patent [19]

Hosoya

[11] Patent Number: 4,489,343
[45] Date of Patent: Dec. 18, 1984

[54] TELEVISION IMAGE RECEIVER PROVIDED WITH VERTICAL SYNCHRONIZING CIRCUIT COUNT SYSTEM

[75] Inventor: Nobukazu Hosoya, Nara, Japan

[73] Assignee: Sanyo Electric Co., Ltd., Moriguchi, Japan

[21] Appl. No.: 371,296

[22] PCT Filed: Sep. 11, 1981

[86] PCT No.: PCT/JP81/00230
§ 371 Date: Apr. 12, 1982
§ 102(e) Date: Apr. 12, 1982

[87] PCT Pub. No.: WO82/01107
PCT Pub. Date: Apr. 1, 1982

[30] Foreign Application Priority Data
Sep. 12, 1980 [JP] Japan .................. 55-127464

[51] Int. Cl.³ .............................. H04N 9/44
[52] U.S. Cl. ........................... 358/17; 358/188
[58] Field of Search .......... 358/149, 150, 139, 188, 358/148, 153, 154, 17

[56] References Cited

U.S. PATENT DOCUMENTS 3,534,163 10/1970 Rao et al. .................. 358/139
3,935,387 1/1976 Kaptein .................... 358/150
4,170,026 10/1979 Nagaoka et al. .............. 358/188
4,253,116 2/1981 Rodgers, III ............... 358/149

Primary Examiner—Richard Murray
Attorney, Agent, or Firm—Armstrong, Nikaido, Marmelstein & Kubovcik

[57] ABSTRACT

In a television image receiver provided with a vertical synchronizing circuit of a count-down system, a down counter to be reset in the an even number of pulse section among the pulses to be partitioned off by the undercuts in the vertical synchronizing signal during the synchronizing operation through the count inputs of the horizontal synchronizing pulses, and a decoder for selectively guiding the output of a plurality of flip-flop circuits constituting the down counter to generate given line selection pulses are provided in said vertical synchronizing circuit to provide a line selector at lower cost and free from error actions even at the weak electric field, etc.

8 Claims, 7 Drawing Figures

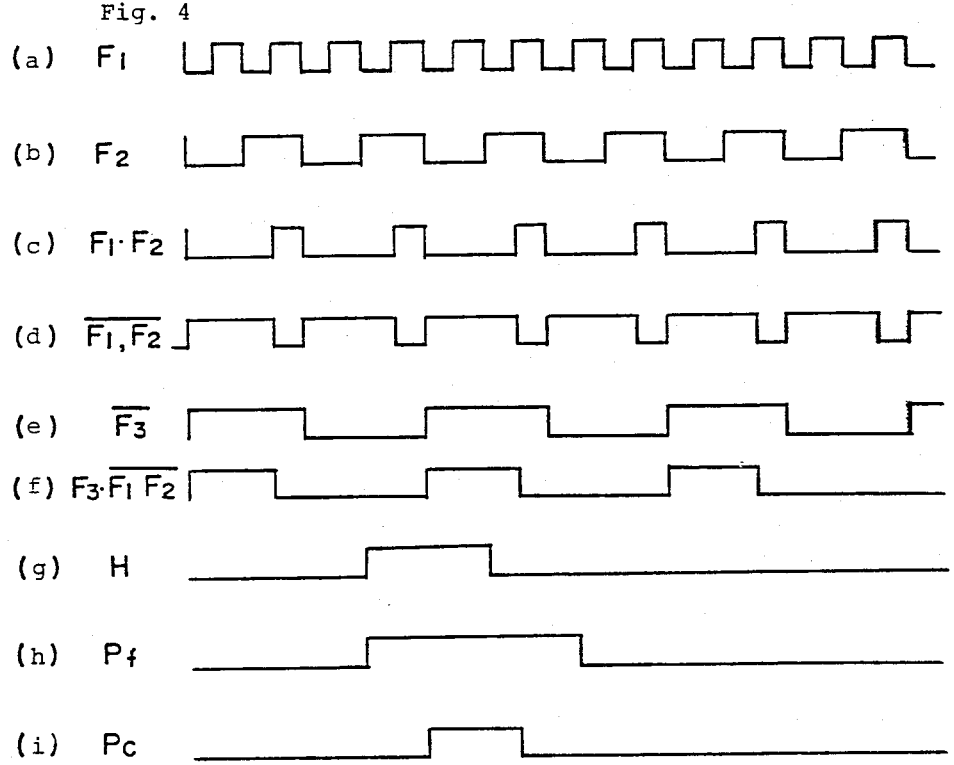
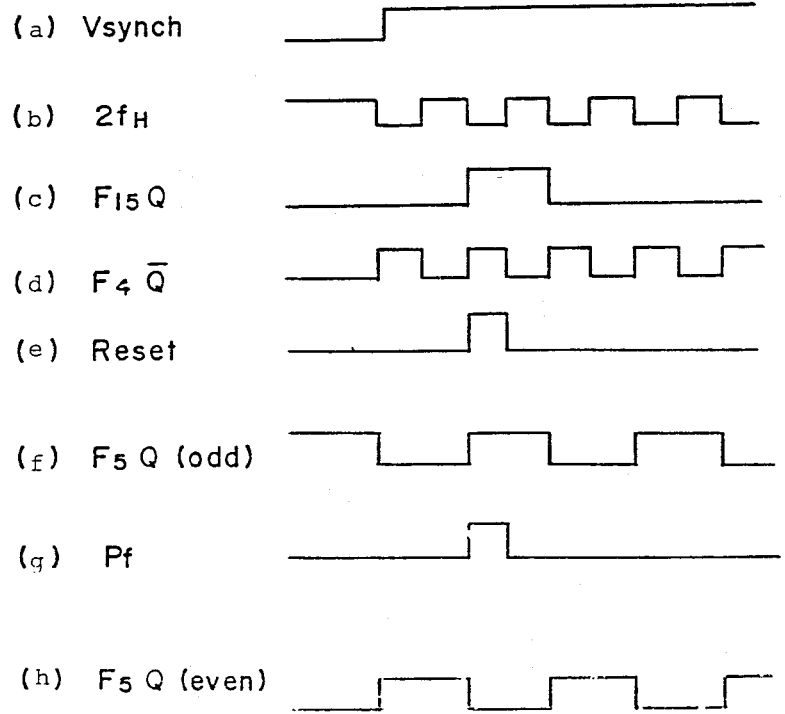

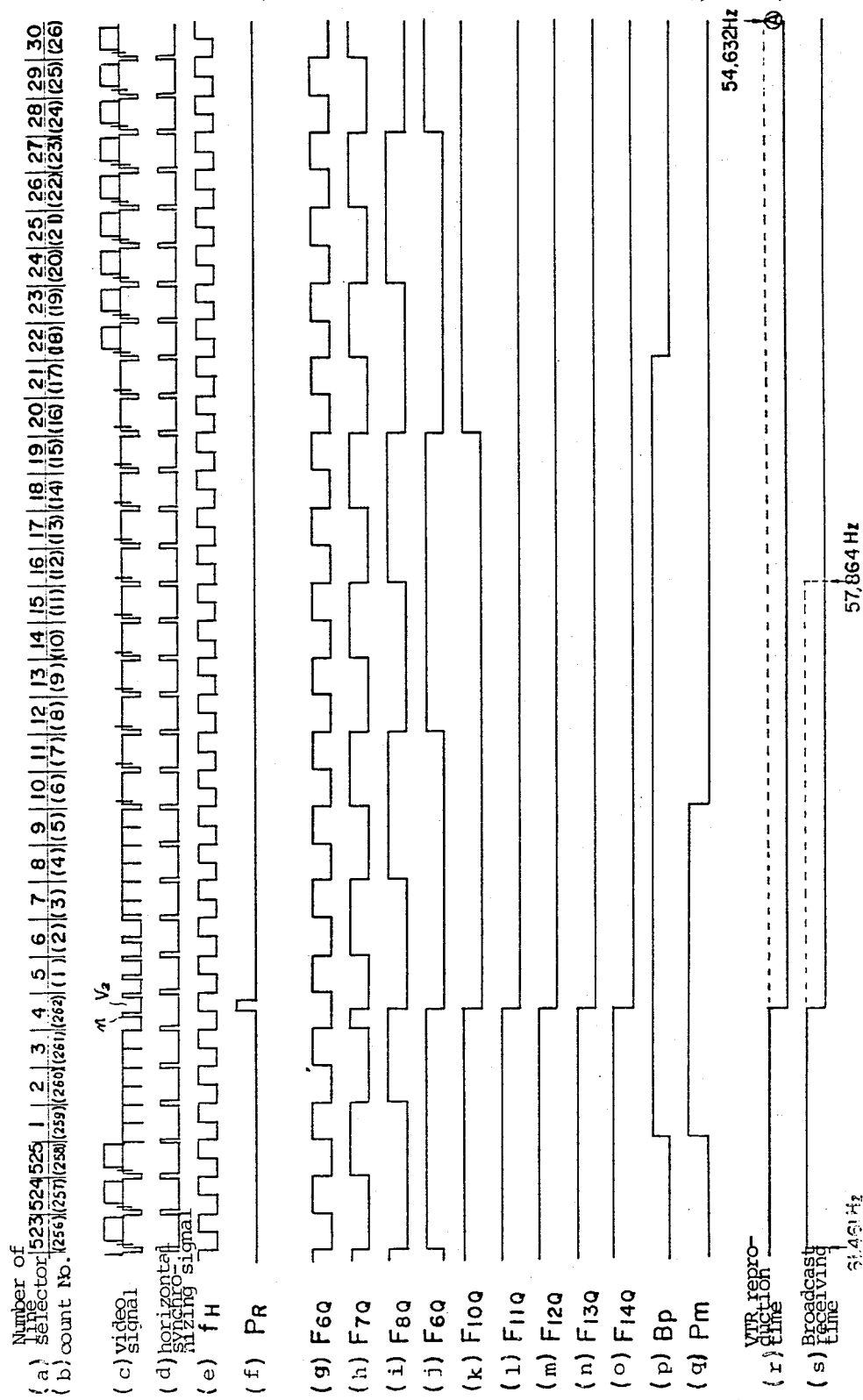

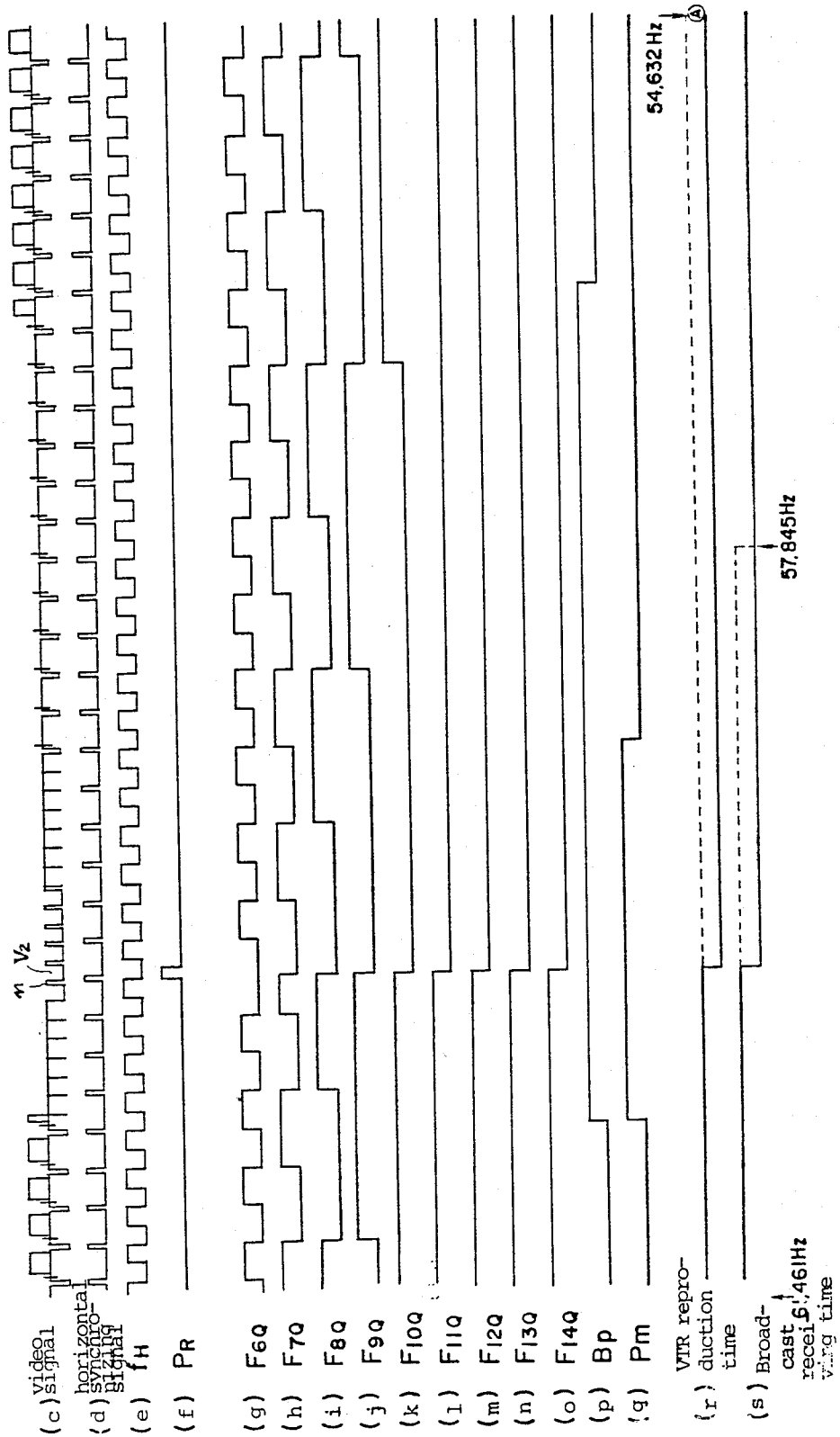

- 7 -

HS ... Horizontal synchronizing circuit,

CD ... Count down circuit, PD ... Phase comparing circuit,

VS ... Vertical synchronizing circuit, DV ... Down counter,

TF ... Drawing frequency (range) setting circuit,

RT ... Reset circuit, HP ... Masking pulse generating circuit, DR ... Decoder circuit, 18 ... PAL, NTSC changeover switch

TELEVISION IMAGE RECEIVER PROVIDED WITH VERTICAL SYNCHRONIZING CIRCUIT COUNT SYSTEM

FIELD OF THE ART

The present invention relates to a television image receiver provided with a vertical synchronizing circuit of a count system. An object of the present invention is to provide a line selector and a field distinguishing circuit, and a compatible circuit of PAL and NTSC, which are lower in cost and higher in reliability in combination with the vertical synchronizing circuit of the count system, particularly in the television image receiver.

BACKGROUND TECHNOLOGY

In a line selector which is used in this type of television image receiver, a vertical synchronizing signal itself is used as the start pulse of the counter. Once the timing at the tip end of the vertical synchronizing signal of the synchronizing detached circuit output is slipped out of timing in weak electric field, etc., the timing of the counter is slipped so that the number of given lines cannot be correctly counted, thus resulting in error actions. Furthermore, since they are separately provided independently, the cost is higher. Also, in a field distinguishing circuit, the vertical synchronizing pulse is detected by a logical circuit, and detection is adapted to be performed whether or not the horizontal synchronizing signal exists in a period of 1H or less from the last pulse of the equivalent pulses after the vertical synchronizing pulses. Thus, the entire circuit becomes complicated and the cost becomes higher. Recently IC is being progressed to simplify the construction of each circuit of the television image receiver. The line selector and the field distinguishing circuit or the compatible circuit of PAL and NTSC are desired to be formed of the IC through the combination with the vertical synchronizing circuit.

Accordingly, a first object of the present invention is to novelly provide a television image receiver provided with the vertical synchronizing circuit of a count down system (or count up system), wherein the line selector, the field distinguishing circuit or the compatible circuit of the PAL and the NTSC are formed of one IC as the simple construction, which is free from the defects of the conventional examples, lower in cost and higher in reliability.

A second object of the present invention is that in this type of television image receiver, the timing of the reset of the down counter of the vertical synchronizing circuit of the count system is specified and the down counter is commonly used in the line selector, whereby the line selector can be easily provided.

A third object of the present invention is that in this type of television image receiver, the logical product between the reset pulse to be provided from the down counter constituting the vertical synchronizing circuit and the horizontal synchronizing pulse, of given pulse width to be provided from the horizontal synchronizing circuit is drawn out to provide the field distinguishing pulse, whereby the field distinguishing circuit can be easily provided.

A fourth object of the present invention is that in this type of television image receiver, a decoder for decoding the output of the frequency dividing circuit is adapted to be switched to the each given vertical frequency with the PAL and the NTSC when the pulse of the horizontal frequency is counted and the vertical synchronization is effected, and the compatible circuit of the PAL and the NTSC can be easily provided.

A fifth object of the present invention is that in this type of television image receiver, the line selector and the field distinguishing circuit and the compatible circuit of the PAL and the NTSC together with the vertical synchronizing circuit of the count system are integrated in circuit through simple construction so that the superior capability can be exhibited.

DISCLOSURE OF THE INVENTION

In the television image receiver of the present invention, the television image receiver provided with a vertical synchronizing circuit of a count down system or a count up system, the counter of the vertical synchronizing circuit is used to combine the line selector or the field distinguishing circuit or the compatible circuit of the PAL and the NTSC or them. For example, the line selector and the field distinguishing circuit and the compatible circuit of the PAL-NTSC compatible circuit are constructed respectively.

In addition, as the preferable example of the present invention, a line selector of a television image receiver is provided with novelty, which is provided with a down counter to be reset in an even number of pulse section among the pulses to be partitioned off by undercuts in the vertical synchronizing signal during the synchronizing operation through the count inputs of the horizontal synchronizing pulses, and a decoder for selectively guiding the output of a plurality of flip-flop circuits constituting the down counter to generate the given line selection pulse.

Also, as the preferable embodiment of the present invention, the field distinguishing circuit of a television image receiver is provided with novelty, which is adapted to distinguish the field due to the existence and the absence of the logical product output between the pulse of the pulse width $T1 (T1 < 1/(2+H)$, fH shows the horizontal frequency) synchronized with the vertical synchronizing signal and the pulse width $T2(T1 < T2 < (1/fH) - T1)$ synchronized with the horizontal synchronizing signal.

In addition, as the preferable embodiment of the present invention, the PAL, NTSC compatible vertical synchronizing circuit of the television image receiver is provided with novelty, wherein a switch for changing over the PAL, the NTSC is externally connected to the IC terminal for externally fixing the tint phase regulating volume. The PAL, NTSC switching circuit to be controlled by the switch is connected. A decoder connected to a frequency dividing circuit for dividing the pulse of the horizontal frequency is switched, through the output of the PAL, NTSC switching circuit, to $fV \approx 2fH/625$ in the case of the PAL and to $fV \approx 2fH/525$ in the case of the NTSC in the relation between the horizontal frequency fH and the vertical oscillation frequency.

Also, the count of the vertical synchronizing circuit provided with the television image receiver in accordance with the present invention can be applied to that of the count down system or that of the count up system.

BRIEF DESCRIPTION OF THE DRAWINGS

FIG. 4 shows wave form diagrams for illustrating the operation of the block circuit diagram of FIG. 2.

FIG. 5 shows wave form diagrams for illustrating the operation of the electric circuit diagram of FIG. 3.

FIGS. 6(a), (b) show wave form diagrams for illustrating the operation of the electric circuit diagrams of FIG. 3, likewise. FIG. 6(a) shows those of an odd number of field. FIG. 6(b) shows those of an even number of field.

BEST MODE FOR CARRYING OUT THE INVENTION

Figure 1:
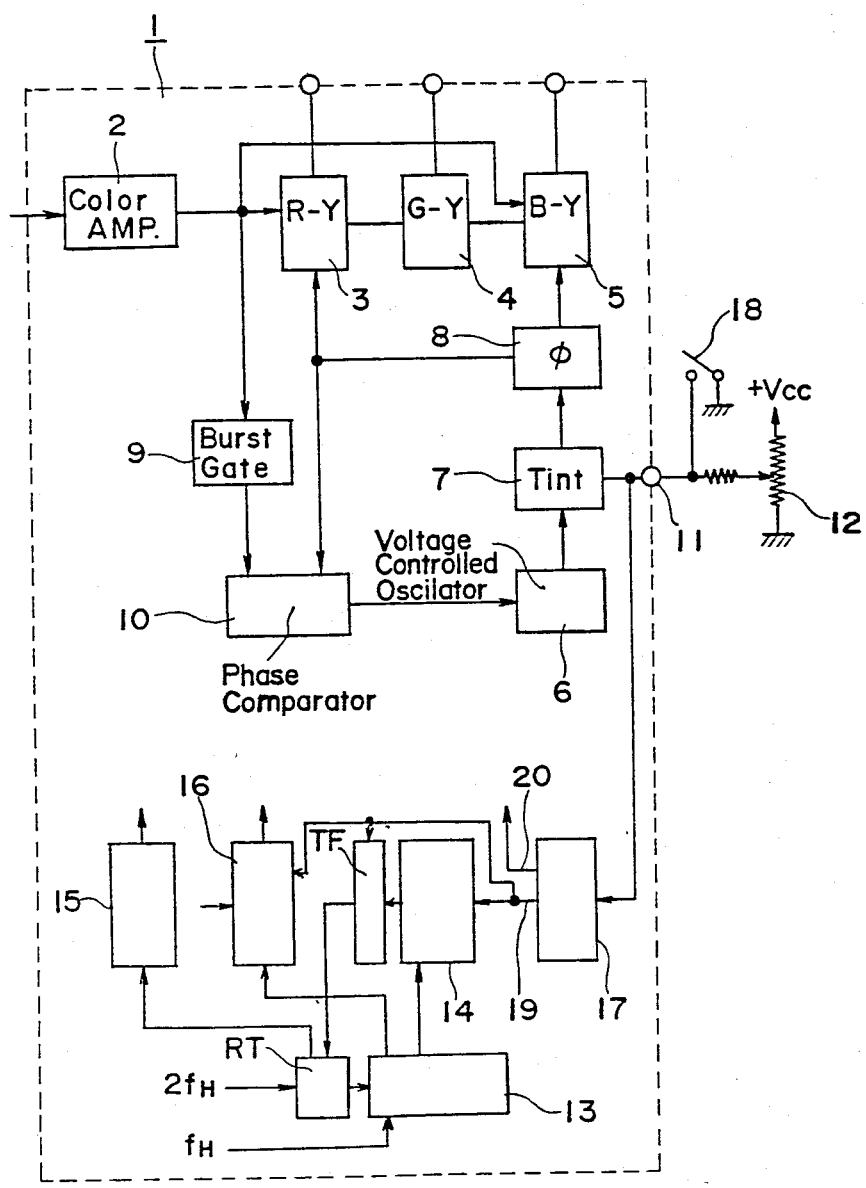
FIG. 1 is a block circuit diagram showing a vertical synchronizing circuit and its related circuit to be incorporated in the television image receiver in accordance with the present invention.

FIG. 1 is a block circuit diagram showing a vertical synchronizing circuit and its related circuit incorporated in a television image receiver in accordance with the present invention.

Referring to FIG. 1, 1 shows a single IC chip and includes many circuits located within the dotted lines of the drawing. 2 is a color amplifier for amplifying composite color signals (carrier color signals + color burst). 3, 4, 5 are R-Y, G-Y, B-Y demodulator, respectively. 6 is a voltage controlled oscillator for generating color complementary carrier waves. 7 is a tint phase regulating circuit. 8 is a phase shifter. 9 is a burst gate. 10 is a phase comparator, which compares in phase the tint complementary carrier waves given through the phase shifter 6 with the color burst from the burst gate 9 thereby to control the frequency of the voltage controlled oscillator 6 and the phase with the output. The above-described blocks constitute a color signal processing circuit. A volume 12 for regulating the tint phase is externally fixed to, through the terminal 11, to the tint phase regulating circuit 7.

13 is a frequency dividing circuit for dividing the pulse of a horizontal frequency fH. 14 is a decoder circuit connected to said frequency dividing circuit, whose output being adapted to drive a drawing frequency (range) setting circuit TF. The output of the drawing frequency setting circuit TF actuates a resetting circuit RT to reset the frequency dividing circuit 13. The output of the resetting circuit RT controls, also, a vertical blanking pulse generating circuit 15. 16 is a masking pulse generating circuit for generating masking pulses by the output or the like of the frequency dividing circuit 13. The decoder circuit 14 and the drawing frequency (range) setting circuit TF, the masking pulse generating circuit 16 are adapted to decode the contents, which are different in PAL and NTSC. The switching operation is effected by the output of a PAL, NTSC switching circuit 17.

Although the switch driving means for the PAL and NTSC is required to be arranged on the exterior portion of the IC$_1$, the PAL, NTSC change-over switch 18 as the switch driving means, together with a tint phase regulating volume 12 for the tint phase regulating circuit 7, is externally fixed to the terminal 11 as shown in FIG. 1. Considering that the tint phase regulating circuit 7 is required to serve simply as an amplifier during the PAL reception and the function of the tint phase regulating volume 12 becomes unnecessary, the terminal 11 for externally fixing the tint phase regulating volume 12 is commonly used to remove the externally fixed terminal of the IC$_1$.

When the change-over switch 18 of the PAL, NTSC is turned on, the terminal 11 becomes low at level (earth electric potential) so that the change-over circuit 17 generates a signal, which causes the condition to be switched to the PAL condition. The signal is given to the decoder circuit 14 and the drawing frequency (range) setting circuit TF, and the masking pulse generating circuit 16 through a first line 19, while the signal is given to the other circuit (color signal processing circuit, etc.) through a second line 20 to switch them into the PAL condition. When the change-over switch 18 is turned off, the NTSC condition is provided.

Figure 2:
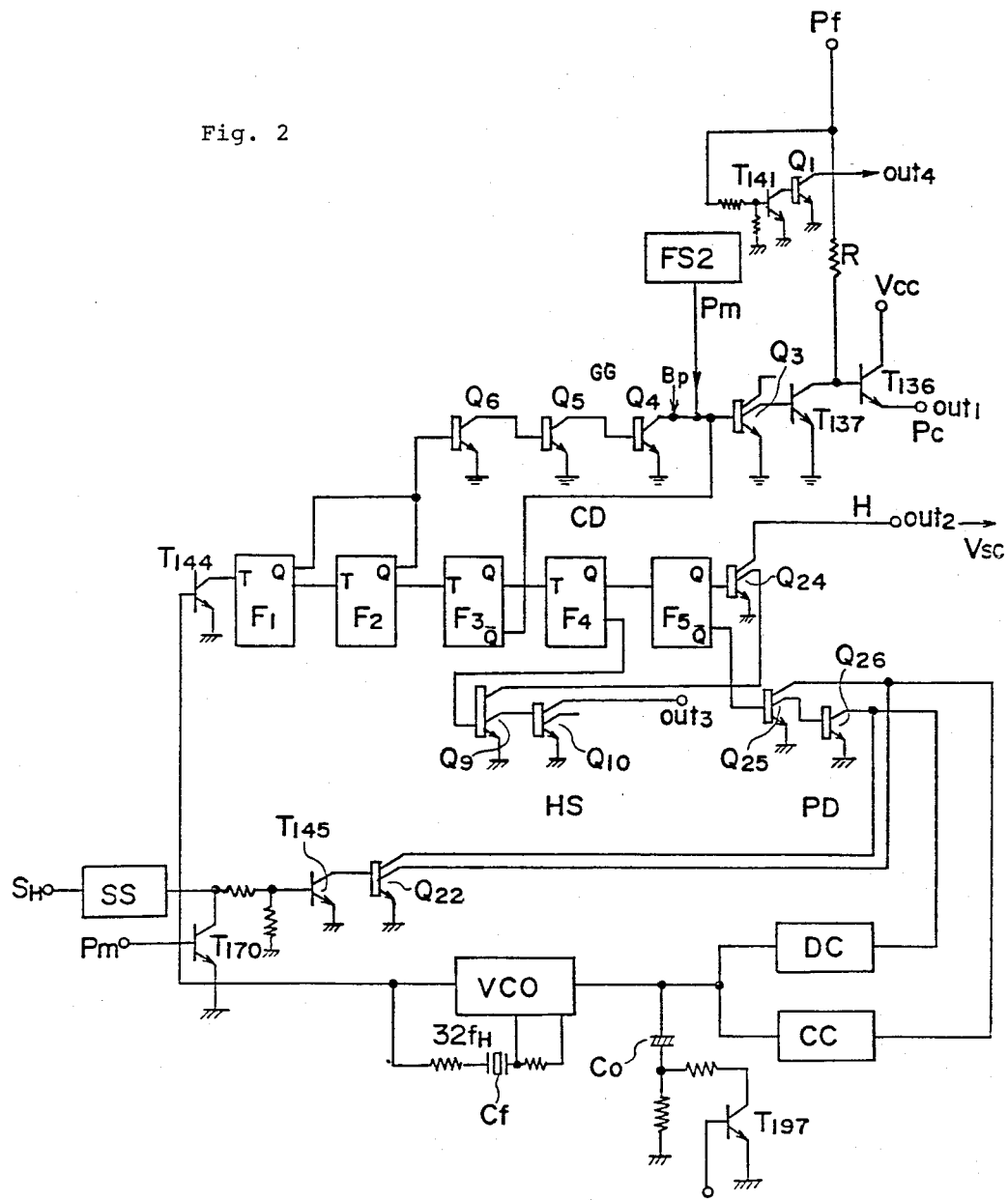
FIG. 2 is a block circuit diagram of a horizontal synchronizing circuit to be incorporated in the television image receiver in accordance with the present invention, likewise.

FIG. 2 is a circuit diagram showing a horizontal synchronizing circuit to be incorporated in the television image receiver of the present invention.

Referring to FIG. 2, the horizontal synchronizing circuit HS, which is provided with a ceramic filter cf, is composed of a variable oscillating circuit VCO for oscillating with a central frequency 32 fH (which shows a horizontal oscillation frequency), a count down circuit CD for stepping down the output of the circuit by 32 and a phase comparing circuit PD. The count down circuit CD is composed of cascade-connected five T flip-flop circuits F1 through F5. The VCO output of 32 fH serves as the trigger input of F1. The horizontal synchronizing pulse of duty 50% and frequency fH is caused in the Q output of the F5.

The phase comparing circuit PD is provided with a transistor Q25 for generating the inversion output Q with the $\overline{Q}$ output of the flip-flop circuit F5 being the input, a transistor Q26 for generating the inversion output $\overline{Q}$, and a circuit Q22 for, in the same polarity, applying horizontal synchronizing signal separated from composite video signals, upon the collectors f the transistors Q25 and Q26. The logical product outputs (a type of error signal) of the collector outputs of the respective transistors Q25, Q26 and the horizontal synchronizing signals are caused upon the collectors of the transistors Q25, Q26. The logical product output to be caused in the collector of each transistor Q25 is applied, as a control input, upon a change controlling circuit cc, while the logical product output to be caused in the collector of the transistor Q26, is impressed, as the control input, upon the discharge controlling circuit DC, whereby the charging amount of the capacitor CO, i.e., the terminal voltage is controlled.

The terminal voltage of the capacitor CO controls the variable phase shift circuit of the variable oscillating circuit VCO and/or the frequency controlling circuit are controlled to cause the frequency and the phase of the output of the VCO to conform to the central point of the horizontal synchronizing signal of the input video signal. The series connection of a resistor Rb, connected in parallel to a resistor Ra connected onto the earth side of the capacitor CO, and a switching transistor T197 is provided for switching operation of the control sensitivity. The series connection will not be fully described, since it is not related to the object of the present invention.

Figure 3:
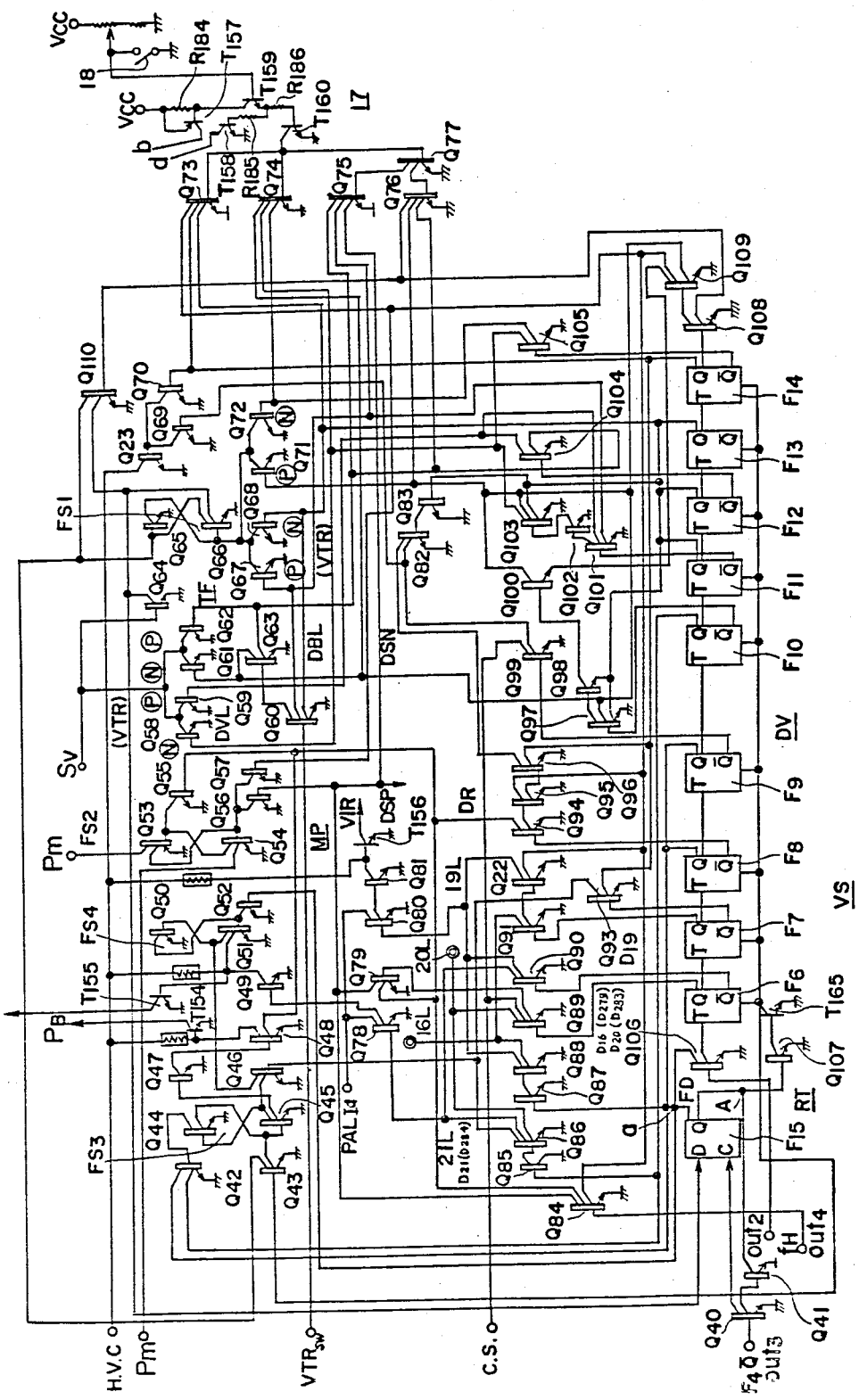
FIG. 3 is an electric circuit diagram showing the details of the vertical synchronizing circuit of FIG. 1.

All the transistors indicated with reference characters Q in the description of FIG. 2 and FIG. 3 are of I$^2$L type (integrated injection logic), wherein the base inputs are inverted to output to the collectors. Also, all the transistors indicated with reference characters T are the normal by-polar transistors.

The control pulse producing circuit GG will be described hereinafter, which produces the control pulses through the use of the output and fly-back pulses of the flip-flop circuit constituting the countdown circuit CD. The transistor Q6 constitutes the logical product output as described in FIG. 4(c) is caused in the collector with the Q outputs of F1, F2 provided as base as shown in FIGS. 4(a), (b). The negative output (FIG. 4(d)) of the logical product output to be caused in the collector of the Q4 through the cascade-connected transistors Q5, Q6 appears in the collector of the transistor Q3 together with the fly-back pulse Pf (FIG. 4(h)) and F32$\overline{Q}$ output (FIG. 4(e)) and is drawn out as the control pulse Pc to the emitter of the transistor T136 as the logical product output of each pulse output. As described hereinabove, the variable oscillating circuit VCO is controlled for synchronization at the center of the horizontal synchronizing signal H (FIG. 4(g)) in 32 fH, the front edge of the control pulse Pc is caused to be located in the horizontal synchronizing signal period. The regulation can be easily performed for satisfaction of the above-described conditions so that the rear edge may be located before the rear edge of the fly back pulse Pf. A masking pulse Pm which is given to the base of the transistor Q3 from anRS flip-flop Fs2 eliminates the vertical synchronizing signal section including an equivalent pulse section and the control pulse Pc from the composite video signal. The horizontal synchronizing signal is inputted to SS. The out 1 (control signal Pc is outputted from the emitter of the transistor T136, the out 2 (horizontal frequency pulse) from the collector of the transistor Q1 and the out 4 (fly-back pulse) form the collector of the transistor Q1.

FIG. 3 is a circuit diagram showing a vertical synchronizing circuit to be incorporated in the television image receiver of the present invention.

The vertical synchronizing circuit VS shown in FIG. 3 is composed of a down counter DV, a drawing frequency (range) setting circuit TF and a reset circuit RT.

The down counter DV, which is composed of nine cascade-connected T-flip-flop circuits F6 through F14, sequentially divides the frequency to the pulse of 50% in duty with the output out 2 of the horizontal synchronizing circuit HS, applied through an inverter tansistor Q106, as count input. Namely, the F6 through F14 in FIG. 3 constitutes a frequency dividing circuit 13 of FIG. 1, i.e., the down counter DV of FIG. 3 to count down the pulses in the horizontal frequency fH (in 15.734 KHz in NTSC, 15.625 KHz in PAL) given through the transistor Q106 from the transistor Q24 of FIG. 2.

The transistor Q43 through Q47 and Q85, Q86, Q93 form the vertical blanking pulse generating circuit 15 of FIG. 1 to output the vertical blanking pulse PB from the collector of the transistor T154 through the collector of the Q47. The transistors Q53 through Q57 form the masking pulse generating circuit 16 of FIG. 1. The masking pulse out 5 is outputted to the collector of the Q53 and is inputted to the base of the transistor Q3 of FIG. 2. The masking pulse Pm to be caused in the collector of the transistor Q54 is given to the base of the transistor T170 of FIG. 2. The transistors Q58 through Q72 and Q82, Q83, Q97, Q98, Q100 through Q110 constitute the decoder circuit 14 of FIG. 1.

The PAL, NTSC switching circuit 17 is composed of transistors T157 through T160, and Q73 through Q77. The base of the transistor T159 is connected to the terminal 11 of FIG. 1.

Since the transistor T159 is turned on in the off condition (which shows the condition of NTSC) of the switch 18 shown in FIG. 3 corresponding to FIG. 1, the transistors T157 and T158 are conducted to output the high level to the (b) point and the low level to the (d) point. The outputs caused at these (b), (d) points set the other necessary circuits, located within the IC$_1$ shown in FIG. 1, into the NTSC condition. Since the transistor T160 is also turned on together with the on of the transistor T159, the transistors Q73, Q74 turn off, while the transistors Q75, Q76 through the transistor Q77 turn on. Thus, the Q56, Q62, Q67, Q71 Q110 connected to the collectors of the transistors Q75, Q76 are put into inoperative positions. The equivalent pulse generating circuit 16 and the decoder circuit 14 are put into NTSC condition. When the switch 18 turns on, T157, T158 turns off due to the cut off of the transistor T159 so that the other circuits connected to the (b), (d) points are put into the PAL condition. Simultaneously the transistors Q73, Q74 turn on and the transistors Q75, Q76 turn off. And the transistors Q57, Q61, Q68, Q70, Q72 connected to the collectors of the transistors Q73, Q74 turn off to put the masking pulse generating circuit 16 and the detector circuit 14 into the PAL condition.

The vertical oscillation frequency in each case of the NTSC, PAL is $$fVN=(fHN/525)\times 2, fVP=(fHP/625)\times 2$$

wherein NTSC vertical oscillation frequency is fVN, NTSC horizontal oscillation frequency is fHN, PAL vertical oscillation frequency is fVP, PAL horizontal oscillation frequency is fHP.

The drawing range of the vertical oscillation frequency is selected as follows abount the respective cases of the broadcast receiving time and the VTR connection time (VTR signal receiving time).

| System | Broadcast Receiving Time | VTR reproduction Time |
|--------|--------------------------|------------------------|
| NTSC | 57.846 through 61.461 Hz | 54.632 through 65.558 Hz |
| PAL | 48.828 through 51.398 Hz | 44.389 through 54.253 Hz |

In this case, the count number of the down counter DV corresponding to each of the frequencies is as follows.

| NTSC System | |
|---|---|
| Frequency (Hz) | Count Number |
| 54.632 | 288 (= $2^8 + 2^5$) |
| 57.846 | 272 (= $2^8 + 2^4$) |
| 61.461 | 256 (= $2^8$) |
| 65.588 | 240 (= $2^7 + 2^6 + 2^5 + 2^4$) |
| 59.939 (central frequency) | 262.5 |

| PAL System | |
|---|---|
| Frequency (Hz) | Count Number |
| 44.389 | 325 (= $2^8 + 2^6 + 2^5$) |
| 48.828 | 320 (= $2^8 + 2^6$) |
| 51.398 | 304 (= $2^8 + 2^5 + 2^4$) |
| 54.253 | 288 (= $2^8 + 2^5$) |
| 50.000 (central frequency) | 312.5 |

The down counter DV is reset in synchronous relation with the vertical synchronizing signal when the vertical synchronizing signal exists within the drawing frequency range (the range of the count number from 288 to 240 in the case of the NTSC system during the VTR reproduction, the range of the count number from 352 to 288 in the case of the PAL system ), (the range of the count number from 272 to 256 in the case of the NTSC system during the broadcast reception, the range of the count number from 320 to 304 in the case of the PAL system) by the frequency of the drawing frequency (range) setting circuit TF and the reset circuit RT to be described later. When the vertical synchronizing signals do not exist, the down counter is automatically reset at a time point when the number has been counted to the count number corresponding to the minimum drawing frequency to be set in accordance with each broadcasting system of the NTSC, PAL, respectively, during the VTR reproduction, and during the broadcast reception, i.e., to each of the count numbers of

|  | NTSC system | PAL system |
|---|---|---|
| VTR reproduction | 288 | 352 |
| Broadcast reception | 272 | 320 | thereby to start the counting from 0 again.

Then, the drawing frequency (range) setting circuit TF will be described hereinafter. The relation between the Q output of each flip-flop circuit constituting the down counter DV and each of the drawing frequencies (corresponding count number) is as follows.

TABLE 1

| | F14 | F13 | F12 | F11 | F10 | F9 | F8 | F7 | F6 |
|---|---|---|---|---|---|---|---|---|---|
| 54.632 Hz | 1 | 0 | 0 | 1 | 0 | 0 | 0 | 0 | 0 |
| 57.846 Hz | 1 | 0 | 0 | 0 | 1 | 0 | 0 | 0 | 0 |
| 61.461 Hz | 1 | 0 | 0 | 0 | 0 | 0 | 0 | 0 | 0 |
| 65.558 Hz | 0 | 1 | 1 | 1 | 1 | 0 | 0 | 0 | 0 |
| 44.389 Hz | 1 | 0 | 1 | 1 | 0 | 0 | 0 | 0 | 0 |
| 48.828 Hz | 1 | 0 | 1 | 0 | 0 | 0 | 0 | 0 | 0 |
| 51.398 Hz | 1 | 0 | 0 | 1 | 1 | 0 | 0 | 0 | 0 |
| 54.253 Hz | 1 | 0 | 0 | 1 | 0 | 0 | 0 | 0 | 0 |

The drawing frequency (range) setting circuit TF adopts circuit construction, wherein the number of the counts corresponsing to the top limit frequency of the above-described drawing frequency is drawn out by a decoder circuit DR (decoder circuit of FIG. 1) to be illustrated later to set the R-S flip-flop circuit Fs1 with the output and the AND output of the set output of the flip-flop circuit and the output of the transistor Q64 with, as the base input, the output of either input vertical synchronizing signal SV or decoder circuit DR for detecting the bottom limit frequency to be illustrated later is drawn out to apply the output, as the D input, upon the D flip-flop circuit F15 constituting the reset circuit RT.

When the down counter DV reaches to the predetermined number of counts, the decoder circuit DR (the decoder circuit 14 of FIG. 1) detects it to reset the frequency dividing circuit 13 to count the frequency dividing circuit 13 again from 0. However, as described hereinabove, the drawing range of the vertical synchronism is required to be 61.461 Hz through 57.846 Hz (accordingly, the count numbers 256 and 272) during the NTSC broadcast reception and to be 65.558 Hz through 54.632 Hz (accordingly, the count numbers 240 and 288) wider than it during the VTR connection of the NTSC. Similarly, it is required to become 51.398 Hz through 48.828 Hz (the count numbers 304 and 320) during the PAL broadcast reception, and to become 54.253 Hz through 44.389 Hz (the count numbers 288 and 352) during the VTR connection of the PAL. Since the switching operation within the decoder circuit 14 is effected even about the broadcast reception time and the VTR connection time, the reset pulse is adapted to be produced only at the count time point of 256 and 272 during the NTSC broadcast reception is effected through the switching voltage to the base of the transistor Q60. For example, during the VTR connection, the transistors Q67, Q68 are set into the operative condition (through the switching operation of the NTSC. PAL, only the one of the transistors Q67, Q68 (the transistors Q67, Q68 are provided to detect the bottom limit counts) is put into the operative condition) through the feeding operation of the high level voltage during the VTR connection thereby to put the transistors QA1, Q62 into inoperative condition. As a result, the top limit count detection during the VTR connection is performed by the transistor Q58 or Q59. On the other hand, the voltage of the low level is given to the base of the transistor Q60 during the broadcast reception to put the transistors Q67, Q68 into inoperative position. Although, at this time, the transistors Q58, Q59 are not put into inoperative positions by the transistor Q60, no problems occur, since the transistors Q61, Q62 operate before in a location where the count number is lower than this. Similarly, although the transistors Q71, Q72 are not set into the inoperative condition by the transistor Q60 during the above-described VTR connection, no problems occur, since the transistors Q67, Q68 operate at a location where the count number is lower.

The construction of the decoder circuit DR for setting the drawing frequency will be described hereinafter with the NTSC system as an example. In the case of the NTSC system, the decoder circuit DR is composed of a decoder Dv1 for the use of the bottom limit drawing frequency 54.632 Hz (count number $288 = 2^8 + 2^5$) during the VTR reproduction, a decoder Db1 of the bottom limit drawing frequency 57.846 Hz (count number $272 = 2^8 + 2^4$) during the broadcast reception, a decoder Dbu for the use of the top limit drawing frequency 61.461 Hz (count number $256 = 2^8$) during the broadcast reception, a decoder Dvu for the use of the top limit drawing frequency 65.558 Hz (count number $240 = 2^7 + 2^6 + 2^5 + 2^4$) during the VTR reproduction.

(1) The decoder Dv1 for the use of the bottom limit drawing frequency 54.632 Hz (count number $288 = 2^8 + 2^5$ during the VTR reproduction is composed of a transistor Q101 with the $\bar{Q}$ output of the flip-flop circuit F11 as the base input, transistors Q102, Q103 to be sequentially cascade-connected to the transistor, a transistor Q105 with the $\bar{Q}$ output of the flip-flop circuit F14 as the base input, and a transistor Q58 with the AND outputs of the collector outputs of the transistors Q103, Q105 as the inputs. The transistor Q58, together with the transistor Q59, operates as the image receiving mode change-over switch of the NTSC-PAL. The Ⓝ in the drawing operates at the NTSC image receiving mode and the Ⓟ operates at the PAL image receiving mode (the same hereinafter).

As apparent from Table 1, the outputs of the F11 and F14 are used, since only the Q output of the F11 and F14 from the Q outputs of the F6 through F14 is "1" at 54.632 Hz.

(i) F11 Q̄ output→Q101 base→Q101 collector→Q102 base→Q102 collector→Q103 base→Q103 collector . . . ①

(ii) On the other hand, F14 Q̄ output→Q105 base→Q105 collector . . . ②

(iii) Logical sums of the ①, ②→Q58 base→Q58 collector→Q64 base→Q64 collector→F15D input→F15Q output→Q107 base. In this order, the transfer is performed and the Q107 collector becomes lower in level. The base bias of the T165 becomes earth level to put the T165 into off condition. As the reset terminal of F6 through F14 becomes high in level, the F6 through F14 are reset to start the counting from the off.

(11) Since only the Q output of F10 and F14 from the Q outputs of F6 through F14 is "1" when the bottom limit drawing frequency during the broadcast reception is 57.846 Hz (count number $272 = 2^8 + 2^4$), the decoder Db1 is composed of a transistor Q97 with the Q̄ output of the flip-flop circuit F10 as the base input through the use of the outputs of F10 and F14, a transistor Q108 with the Q output of the flip-flop circuit F14 as the base input, a transistor Q109 to be cascade-connected to the transistor and a transistor Q61 with the AND output between the collector output of the transistor Q109 and the collector output of the transistor Q97 being provided as the base input.

The transistor Q61, together with a transistor Q62, operates as an NTSC-PAL image receiving mode changeover switch.

(i) F10 Q̄ output→Q97 base→Q97 collector . . . ③

(ii) F14Q output→Q108 base→Q108 collector→Q109 base→Q109 collector . . . ④

(iii) Logical sums of ③, ④→Q61 base→Q61 collector→Q64 base→Q64 collector→F15D input→F15Q output→Q107 base.

In this order, the transfer is performed. The Q107 collector becomes lower in level. The base bias of the T165 becomes earth electric potential. Thus, the T165 is put into off condition and the reset terminals of F6 through F14 become high in level. The F6 through F14 are reset and start the counting from 0.

(111) A decoder Dbu for the use of the top limit drawing frequency 61.461 Hz (count number $256 = 2^8$) during the broadcasting reception is similarly composed of a transistor Q105 for reversing the Q output of the flip-flop circuit F14 and a transistor Q72 with the output as the base input. The transistor Q72, together with the transistor Q71, functions even as the NTSC-PAL image receiving mode change-over switch. The R-S flip-flop Fs1 is set with the output.

(i) F14 Q̄ output→Q105 base→Q105 collector→Q72 base→Q72 collector→Q66 base→Q66 collector→F15D input F15Q output→Q107 base. The transfer is performed in this order and the Q107 collector becomes low in level. Thus, the base bias of T165 becomes earth electric potential and T165 turns off. The reset terminals of the F6 through F14 become high in level. The F6 through F14 is reset to start the counting from 0.

(IV) A decoder Dvu for the use of the top limit drawing frequency 65.558 Hz (count number $240 = 2^7 + 2^6 = 2^5 + 2^4$) during the VTR reproduction is composed of a transistor Q97 with the Q̄ output of the flip-flop circuit F10 as the base input, and a transistor Q68 with the AND output, of the collector output of the transistor and each Q output of the flip-flop circuits F11, F12, F13, as the base input. The transistor Q68 functions even as the NTSC-PAL image receiving change-over switch. The R-S flip-flop circuit Fs1 is set with the output.

(i) F10Q̄ output→Q97 base→Q97 collector . . . ⑤

(ii) F11Q output . . . ⑥

(iii) F12Q output . . . ⑦

(iv) F13Q output . . . ⑧

(v) Logical sums of ⑤, ⑥, ⑦, ⑧→Q68 base→Q68 collector→Q66 base→Q66 collector→F15D input→F15Q output→Q107 base. In this order, the transfer is performed. Since the Q107 collector becomes low in level, the base bias of the T165 becomes earth electric potential and the T165 is put into off condition. The reset terminals of the F6 through F14 become high in level and start counting from 0.

Even in the PAL system, things are fundamentally the same. Thus, the description will be omitted. The operation about the case of the PAL is as follows.

(V) 44.389 Hz ($352 = 2^8 + 2^6 + 2^5$)

(i) To decrease the gate number in this case, the reset is applied at a time point when F6 through F14 have counted 256, and furthermore the reset is applied at a time point when they have counted 96 ($352 - 28$). When the F6 through F14 count 256, the transfer is performed in the order of F14Q output→Q108 base→Q108 collector→Q110 base→Q110 collector→F15D input→F15Q output→Q107 base. The Q107 collector becomes low in level. The T165 turns off. The reset terminals of F6 through F14 become higher in level. They are reset and starts counting again from 0.

(ii) F11Q̄ output→Q101 base→Q101 collector . . . ⑨

(iii) F12Q̄ output→Q104 base→Q104 collector . . . ⑩

(iv) Logical sums of ⑨, ⑩ →Q59 base→Q59 collector→Q64 base→Q64 collector→F15D input→F15Q output→Q107 base. The transfer is performed. Q107 collector becomes low in level. The base bias of the T165 becomes earth electric potential and the T165 turns off. The resetting terminals of the F6 through F14 become high in level and the F6 through F14 is reset to start counting from 0.

(VI) 48.828 Hz ($320 = 2^8 + 2^6$)

(i) Even in this case, the reset is performed at a time point when the F6 through F14 have counted 256 as in the (V). The reset is further performed at a time point when they have counted 64 ($320 - 2^8$).

(ii) When the F6 through F14 have counted 256, the transfer is performed in the order of F14Q output→Q108 base →Q108 collector→Q110 base→Q110 collector→F15D input→F15Q output→Q107 base. The collector of the Q107 becomes low. The T165 turns off and the F6 through F14 are reset. When they have counted 64, the transfer is performed in the order of F12Q̄ output→Q104 base→Q104 collector→Q62 base→Q62 collector→Q64 base→Q64 collector→F15D input→F15Q output→Q107 base. As the Q107 collector becomes low in level, the base bias of the T165 becomes earth electric potential and the T165 turns off. The reset terminals of the F6 through F14 become high in level. The F6 through F14 become high in level. The F6 through F14 are reset to count from 0.

(VII) 51.398 Hz ($304 = 2^8 + 2^5 + 2^4$)

(i) The reset is performed when the F6 through F14 have counted 256 as in the (V), (VI), and the reset is further performed at a time point when they have counted 48 ($304 - 2^8$). The transfer is performed in the order of F14Q̄ output→Q108 base→Q108 collector→Q109 base→Q109 collector→Q110 base→Q110 collector→F15D input→F15Q output→Q107 base at a time point when they have counted 256. As the Q107 collector becomes low in level, the T165 turns off. The F6 through F14 are reset to start counting from 0. At a time point when 48 has been counted, (ii) F10$\overline{Q}$ output→Q97 base→Q97 collector→Q98 base→Q98 collector→Q100 base→Q100 collector ... ⑪

(iii) F11$\overline{Q}$ output→Q101 base→Q101 collector→Q102 base→Q102 collector→Q103 base→Q103 collector ... ⑫

(iv) Transfer is performed in the order of the logical sums of the ⑪ and ⑫ →Q71 base→Q71 collector→Q66 base→Q66 collector→F15D input→F15Q output→Q107 base. The Q107 collector becomes low in level and the T165 turns off. The reset terminals of the F6 through F14 become high in level. The F6 through F14 are reset to start counting from 0.

(VIII) 54.253 Hz (288=$2^8+2^5$)

(i) When the F6 through F14 have counted 256, they are reset as in the (V), (VI) (VII). They are further reset at a time point when they have counted 32 ($288-2^8$).

(ii) The F6 through F14 are reset as shown in the (V), (VI), (VII), at a time point when 256 has been counted, and starts counting again from 0. At a time point when 32 has been counted, the transfer is performed in the order of F11$\overline{Q}$ output→Q101 base→Q101 collector→Q67 base→Q67 collector→Q66 base→Q66 collector→F15D input→F15Q output→Q107 base. The Q107 collector becomes low in level. The base bias of the T165 becomes earth electric potential. The T165 turns off and the reset terminals of the F6 through F14 become high in level. The F6 through F14 are reset to start counting from 0.

The drawing operation (synchronized operation) will be described hereinafter by way of the NTSC broadcast reception. When the down counter DV counts, by 256, the horizontal frequency pulses as described hereinabove, the transistor Q72 turns on to turn off the transistor Q66, which constitutes the transistor Q65 and the RS flip-flop. As a result, the input of the D flip-flop F15 is adapted to be controlled by a vertical synchronizing signal to be inputted to the base of the transistor Q64. Once the vertical synchronizing signal is given, the transistor Q64 turns off and the D input of the D flip-flop F15 becomes high in level. Since the 2 fH is applied upon the clock input (C input) of the D flip-flop F15, the D input is transferred by the clock of this 2 fH to turn on the transistor Q107 and to turn off the transistor T165. As a result, the flip-flop circuits F6 through F14 are reset. This fact means that the synchronization is effected by the vertical synchronizing signal. The transistor T165 turns off and simultaneously the condition of the RS flip-flop Fs$_1$ is reversed at the route of the transistor Q43→transistor Q65. The transistor Q66 is turned on and the D input of the D flip-flop F15 becomes low in level. As a result, the D input of the D flip-flop F15 is independent of the vertical synchronizing signal till the following 256 counting time. When the vertical synchronizing signal does not come in the period from the 256 count of the fH to 272 count, the transistor Q61 turns on and the transistor Q64 turns off when the 272 has been counted. The Q output of the D flip-flop F15 becomes high in level. The transistor Q107 turns on and the transistor T165 turns off. The reset is applied upon the flip-flop circuits F6 through F14. The condition of the RS flip-flop Fs$_1$ is reversed, at the route of the transistor Q43→the transistor Q65, thereby to be restored to its original condition. When the vertical synchronizing signal comes in a period from the 256 count of the horizontal frequency fH to the 272 count thereof, it is drawn to the vertical synchronizing signal. However, at the other condition, it is not drawn thereto.

As described hereinabove, according to the present invention, the decoder for decoding the output of the frequency dividing circuit is adapted to be switched to become respective given frequencies, respectively, at PAL and NTSC when the pulses of the horizontal frequency are counted down for vertical synchronization. Thus, the IC of the television image receiver can be used in common by the PAL and the NTSC and the common effect is large. The present invention has an effect in that the smaller number of externally secured terminals of the IC will do, and the terminal can be rendered earth electric potential, during the PAL reception, by the change-over switch to cut off the influences of the tint phase regulating volume from the tint phase regulating circuit, since the switching drive uses the externally secured terminals of the tint phase regulating volume in the color signal processing circuit. Thus, the present invention is extremely effective in that the amplitude variation in the tint complementary carrier waves passing through the tint phase regulating circuit (which is required to be operated as a mere amplifier during PAL reception) during the PAL reception can be avoided. Accordingly, change in white balance, which is caused due to the unbalance of the tint complementary carrier waves, can be prevented.

The resetting circuit will be described hereinafter. The resetting circuit RT is composed of a D-flip-flop circuit F15, wherein the output of the R-S flip-flop circuit Fs$_1$ (the collector output of the transistor Q66), the collector output of the transistor Q64, or the AND output of each collector output of the transistor Q61 (during NTSC broadcast reception) or of the Q58 (during VTR reproduction of NTSC) becomes D input, the Q output of F4 from among the T flip-flop circuits F1 through F5 constituting the down counter of the horizontal synchronizing circuit HS becomes C input; an AND connecting circuit A for drawing the AND, of the Q output of the circuit and of the $\overline{Q}$ output of the flip-flop circuit F4; and the cascade-connected transistors Q107, T165. All the flip-flop F6 through F14 of the down counter DV are reset with the output of the transistor T165. The reset output to be caused in the transistor T165 is applied, when necessary, upon the vertical driving circuit (not shown) as the vertical synchronizing signal through a buffer or an invertor transistor. To prevent the error operation of the line selector in an odd field and even field, the reset pulse is adapted to be generated at an even number location (a second location in the embodiment) among the pulses partitioned off with the serrated pulse of the vertical synchronizing signal as shown in FIGS. 6(a), (b) FIG. 6(a) shows pulse wave forms for distinguishing the odd-number field. FIG. 6(b) shows pulse wave forms for distinguishing the even-number field.

A masking pulse generating circuit MP for eliminating or masking, in the vertical synchronizing signal section including the front and after equivalent pulse section, the composite synchronizing signal inputs of the AFC circuit, the burst gate making circuit, a DC reproduction pulse producing circuit and the synchronism detecting circuit will be described hereinafter in detail.

The masking pulse generating circuit MP is composed of an R-S flip-flop circuit Fs2, decoders SCN, DSP for set pulse use, and a decoder DR for reset use. The R-S flip-flop circuit Fs2, which is composed of the cross connection of a pair of transistors Q53, Q54, is reset by the collector output of the transistor Q57 in the NTSC image receiving mode and by the collector output of the transistor Q56 in the PAL image receiving mode. Even in any image receiving modes, it is reset by the collector output of the transistor Q55. The masking pulse Pm is drawn out from the collector of the transistors Q54 and Q53. The former urges the switching transistor T170 shown in FIG. 2 to earth the horizontal synchronizing signal output terminal of the horizontal synchronizing circuit HS. The latter is applied upon the base of the transistor Q3 in the gate pulse generating circuit BP to be connected to the horizontal synchronizing circuit HS to cut off the transistor in the masking pulse applying section.

The decoder DSN for setting the R-S flip-flop circuit Fs2 is composed of the cascade-connected transistors Q91, Q92 for drawing out the Q outputs of the transistors Q94, Q95, F7, which guide the $\overline{Q}$ outputs of a pair of cascade-connected transistors Q108, Q109, F8 for guiding the Q output of the flip-flop circuit F14 in the NTSC image receiving mode, and a transistor Q84 which turns on with the horizontal blanking pulse thereby to turn off the transistor Q57 in the fly-back pulse section. Under such construction as described hereinabove, the setting transistor Q57 keeps the Q output (0) of each flip-flop circuit F14 to H (high level), the output (i) of F8 to L (low level) and the Q output (h) of F7 to H as shown in FIG. 6. The collector of the transistor Q84 of H turns on at the timing of the vertical blanking pulse Pb (p) to set the R-S flip-flop circuit Fs2.

Similarly, the decoder DSP for set pulse use in the PAL image receiving mode is composed of transistors Q101, Q102 and Q103 for reversing the $\overline{Q}$ outputs of the transistors Q108, Q109, F11, which guide the Q output of the flip-flop circuit F14, to feed the $\overline{Q}$ outputs as the Q output, transistors Q89, Q79 for reversing and guiding the $\overline{Q}$ output of the F8 to feed it as the Q output, and the transistor Q84, the transistors Q101, Q102, Q103, Q89, Q79, Q84 being connected in combined shape. And in the PAL image receiving mode, the Q output of each flip-flop circuit F14 retains the condition of H with respect to the base of the setting transistor Q56, the Q output of the F11 retains the condition of H, the Q output of the F8 retains the condition of H, and the Q output of the F6 retains the condition of L. And the collector of the transistor Q84 feeds the H pulse at the timing of H to turn on the transistor Q56 thereby to set the R-S flip-flop circuit Fs2.

The details of a decoder DR for resetting pulse use will be described hereinafter. The decoder DR for resetting pulse use is provided with a transistor Q94, which draws out the $\overline{Q}$ output of the flip-flop circuit F8 through inversion thereof, transistors Q89, Q79 for guiding the Q output of the flip-flop circuit F6, transistors Q84 and Q48. As shown in FIG. 6, the flip-flop circuits F8 and F6 are set with the Q output g of F8 being H, the Q output e of F6 being H, the collector of the transistor Q84 being H n, i.e., in a section where no blanking pulses exist, and the collector of the transistor Q48 being H, with the reset pulse of the down counter DV. The collector output of the transistor Q48 to be on- and off-controlled by the output of the R-S flip-flop circuit Fs3 (which is composed of transistors Q44, Q45) to be reset with 22nd line selector pulse (described later) turns on the resetting transistor Q55 with each timing of the H thereby to reset the SR flip-flop circuit Fs2. The decoder DR for reset pulse use is used for NTSC, PAL image receiving mode. The masking is applied, upon the input signal of the AFC circuit and/or the output signal of the burst gate pulse producing circuit BP, by the use of the equivalent pulse and the masking pulse Pm for covering almost the vertical synchronizing signal section and at such a timing as described hereinabove. The respective signals are eliminated between the vertical synchronizing signal sections including the masking pulse section thereby to improve all the image deteriorating factors such as bent image of the horizontal scanning starting end, uneven brilliance near the vertical synchronizing signal section, i.e., of the upper picture face, deteriorated S/N ratio of tint reproduction system and lowered sensitivity of the horizontal synchronizing detection circuit.

The construction of the decoder for line select use will be described hereinafter.

(1) Line selecting decoders D16, D20, D279 and D283 for drawing out literal multiple signals of NTSC system (Japan) are adapted to take out the selection pulse for drawing out the 16th and 20th lines of the first field where the literal mutiple signal exists and the 279th, 283rd lines of the second field.

(i) The Q, $\overline{Q}$ outputs of the flip-flop circuits F6 through F10 of the down-counter DV in the 16th and 279th lines are as follows.

|   | F6 | F7 | F8 | F9 | F10 |
|---|----|----|----|----|----|
| Q | L | L | H | H | L |
| $\overline{Q}$ | H | H | L | L | H |

Considering this condition, the decoders D16 and D279 are composed of transistors Q87, Q88 for guiding the Q outputs of the flip-flop circuits F8, F9, a transistor Q89 for drawing out the inversion output of the Q output of the F6, and a transistor Q91 for reversing the Q output of the F7. The 16th or 279th line selection pulse is drawn out as the logical product of the collector output of each transistor of Q88, Q89, Q91.

(ii) Similarly, considering that the Q, $\overline{Q}$ outputs of the flip-flop circuits F6 through F10 of the down counter DV in the 20th and 283rd lines are

|   | F6 | F7 | F8 | F9 | F10 |
|---|----|----|----|----|----|
| Q | L | L | L | L | H |
| $\overline{Q}$ | H | H | H | H | L | the 20th and 283rd line selecting decoders D20 and D283 are composed of a transistors Q85, Q86 for drawing out the Q output of the flip-flop circuit F10 and a transistor Q89 for drawing out the Q output of F6 through inversion. A pulse for selecting the 20th and 283rd lines is drawn out as the logical product of the collector output of the transistors Q86 and Q89.

(11) Then, the line selecting decoder D19 for forming a VIR drawing-out pulse in the NTSC (the United States of America) system, i.e., the 19th line selector pulse will be described hereinafter. The Q, $\overline{Q}$ output condition of the flip-flop circuits F6 through F10 of the down counter in the 19th line will be apparent as follows.

|   | F6 | F7 | F8 | F9 | F10 |
|---|---|---|---|---|---|
| Q | H | H | H | H | L |
| Q̄ | L | L | L | L | H |

Considering the condition of such flip-flop circuit, the decoder D19 is composed, as described hereinabove, of transistors Q87, Q88 for guiding the Q outputs of the flip-flop circuits F8, F9, a transistor Q90 for drawing out the inversion pulses of the Q outputs of the F6, and transistors Q91, Q92 for drawing out the Q output of the F7. The selector pulse is adapted to be formed as the logical product pulses of the collector outputs of the transistors Q88, Q90 and Q92. The decoder D19 serves as a decoder for drawing out the 282nd line in the second field. According to the present invention, the down counter of the vertical synchronizing circuit is adapted to be used and thus the low-cost and reliable line selector can be realized.

(111) The logical circuit is provided from the charts of F6 through F10 among the flip-flop circuits F6 through F14 for constituting the down counter DV even about the other lines (for example, decoder D21 for forming a first field, a 21st pulse, which is adapted to draw out the literal multiplex signal of NTSC (the United States of America)) in accordance with the feature, object of the image receiver, and the drawing-out operation is adapted to be easily performed as the logical product output.

For example, the literal multiplex signal of the NTSC (the United States of America) is now inserted only into the 21st of the first field. In the 21st line and 284th line, the Q and Q̄ outputs of flip-flop circuits F6 through F10 are as follows.

|   | F6 | F7 | F8 | F9 | F10 |
|---|---|---|---|---|---|
| Q | H | L | L | L | H |
| Q̄ | L | H | H | H | L |

Accordingly, to provide the selector pulse for drawing out only the 21st line, the logical circuit for drawing out pulse when the condition of the flip-flop circuits F6 through F10 has been satisfied is realized. A selector pulse for distinguishing the odd from the even (first and second fields) and drawing out the logical product of the distinguishing pulse of the first field to draw out the 21st line only is required to be specified and drawn out.

The detail of the 21st and 244th line selecting decoder will be described hereinafter. An odd, even field distinguishing circuit FD will be described hereinafter. Then, a logical product connection for distinguishing and extracting the 21st line selector pulse only will be described. The 21st and 284th line selecting decoders D21 and D284 are cascade-connected transistors Q85, Q86 for drawing out the Q output of the flip-flop circuit F10 and a transistor Q90 for reversing and guiding the Q̄ output of the F6. The line selector pulse is outputted, as the logical product output, to the commonly connected collectors of the transistors Q86 and Q90.

The field distinguishing circuit FD is basically composed of a D flip-flop circuit F15 wherein the collector output of the transistor Q64 which turns off through the vertical synchronizing signal input, and the logical product H output of the Q66 of the R-S flip-flop circuit Fs1 are provided as inputs, the Q output (frequency 2 fH, wherein fH shows the pulse of the horizontal frequency duty 50%) of the flip-flop circuit F4 constructing the down counter of the horizontal synchronizing circuit HS is the clock pulse, a transistor Q106 for feeding, to the collector, the Q output (namely, pulse of horizontal frequency duty 50%) of the flip-flop circuit F5 of the down counter, the Q terminal of the D flip-flop F15, the logical product connection of the transistor Q106, the output thereof being adapted to set the R-S flip-flop circuit Fs4.

The R-S flip-flop circuit Fs4 is composed of transistors Q50, Q52. The field distinguishing pulse of a section H where the rising operation is performed by a set pulse and the falling operation is performed by a reset pulse is applied upon the collector of the transistor Q49 with the collector output of the transistor Q52, which turns on through the field distinguishing output, as the set input and with the 21st line drawing-out line selector pulse, to be produced on the collector of the transistor Q46, as the reset input. Only the former from the 21st and 284th drawing-out line selector pulses to be produced on the collector of the transistor Q49 through the transistor Q78 is applied upon the base of the output transistor T155 as the logical product output.

The reset pulse and field distinguishing pulse forming operations will be described with reference to FIG. 5.

When the vertical synchronizing signal Vsynch as shown in FIG. 5(a) is applied, as described hereinabove, upon the D input terminal (D) of the D flip-flop circuit F15, and the pulse of 2 fH as shown in FIG. 5(b) is applied upon the clock input terminal (C), the D input immediately before the inversion is outputted during the inversion of the L from the H of the clock pulse, upon the Q output terminal, in the case of the D flip-flop circuit as is known. The pulse as shown in FIG. 5(c), i.e., pulse as FIG. 5(c) wherein the rising operation is effected by the even number pulse, the second pulse in the embodiment is caused from among the pulses whose vertical synchronizing signal is partitioned off by the pulse space corresponding to the equivalent pulse. The pulse is further applied upon the collector of the transistor Q41. The logical product of FIG. 5(d) the Q̄ output of the flip-flop circuit F4 to be appeared on the collector of the transistor Q41 is drawn out so that the reset pulse shown in desired FIG. 5(c) can be provided.

The reset pulse is caused in the 2nd V2 of the pulse partitioned off by the undercut n of the vertical synchronizing pulse V.

As apparent from the reset pulse comparison of FIG. 5(e) with FIG. 5(f) or (e), the Q output of the flip-flop circuit F5 becomes the same in polarity, in the first field, as the reset pulse. But in the second field, the Q output (FIG. 5(f)) of the flip-flop circuit F5 becomes different in polarity from the reset pulse (FIG. 5(e)). Accordingly, the logical product between the reset pulse (FIG. 5(e)) and the Q output (FIG. 5(f)) of the flip-flop circuit F5 is provided to easily get the field distinguishing pulse Pf (FIG. 5(g)).

According to the present invention, the horizontal scanning synchronizing pulse, of a given pulse width, easily extractable from the horizontal synchronizing circuit and the reset pulse indispensable to the down counter, which constitutes the vertical synchronizing circuit, are used. Only the addition of a circuit for drawing out the both logical product outputs will do. The reliable field distinguishing circuit can be realized at lower cost.

The present invention has been described in detail in accordance with the above-described embodiment. The embodiment can be variably modified or corrected, by those skilled in the art, within the range described in the scope of the present invention.

I claim:

1. A television receiver comprising:
   (a) a vertical synchronization circuit having:
      (i) a counter means for counting down the horizontal synchronization pulses, said counter means having a plurality of flip-flops connected in series to each other;
      (ii) first decoder means, coupled to the output of said counter means, for specifying a predetermined region related to a frequency of the vertical synchronization signal; and
      (iii) reset signal producing means for resetting said counter means in response to said vertical synchronization signal when a vertical synchronization signal is applied only in said predetermined region, and resetting said counter means in response to an output from said first decoder means at a count which corresponds to the edge of said range and which is greater than when a vertical synchronization signal is not applied within said predetermined region; and
   (b) second decoder means, coupled to the output of said counter means, for generating a pulse representing a particular line after the vertical synchronization signal period and equivalent pulse period.

2. A television receiver as claimed in claim 1, wherein said first and second decoder means have, respectively, an NTSC portion and PAL portion connected to output terminals of said counter means producing counted numbers which are different from each other, and wherein said television receiver has an NTSC/PAL switch for selecting either the NTSC portion or PAL portion.

3. A television receiver as claimed in claim 1, wherein each of said portions is set such that the relationship between horizontal frequency fH and vertical frequency is $f_v \approx 2f_H/625$ for PAL, and is $f_v \approx 2f_H/525$ for NTSC.

4. A television receiver as claimed in claim 1, further comprising a third decoder means connected to said counter means of said vertical synchronization circuit for detecting a field.

5. A television receiver as claimed in claim 1, further comprising means for resetting said counter means by a separated pulse of even number pulses of all the pulses separated by vertical synchronization signal.

6. A television receiver as claimed in claim 1, further comprising a field detecting circuit for producing a field detected pulse by taking a logical AND between an output pulse from said reset signal producing means and a horizontal synchronization pulse having a constant pulse width, extracted from a horizontal synchronization circuit.

7. A television receiver as claimed in claim 6, further comprising means for producing a pulse representing a particular line from the output from said counter means in said vertical synchronization circuit, and means for extracting an output signal from said particular line representing pulse producing means only when said field detected pulse is applied.

8. A television receiver as claimed in claim 6, wherein said reset pulse width T1 is smaller than $\frac{1}{2}$ fH, and said horizontal synchronization pulse width T2 is greater than T1 but smaller than $(1/f_H - T1)$.

* * * * *